(12) United States Patent
Danilo et al.

(10) Patent No.: US 6,860,203 B2
(45) Date of Patent: Mar. 1, 2005

(54) METHOD AND APPARATUS FOR PRINTING COMPUTER GENERATED IMAGES

(75) Inventors: Alexander Vincent Danilo, Killarney Heights (AU); Timothy John Lindquist, Leura (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/930,472

(22) Filed: Aug. 16, 2001

(65) Prior Publication Data

US 2002/0121209 A1 Sep. 5, 2002

(30) Foreign Application Priority Data

Sep. 7, 2000 (AU) .............................................. PQ9957

(51) Int. Cl.⁷ .............................................. B41J 11/44
(52) U.S. Cl. ..................... 101/485; 101/484; 400/61; 400/70; 400/76
(58) Field of Search .............................. 400/76, 61, 70; 101/484, 485; 358/1.16

(56) References Cited

U.S. PATENT DOCUMENTS

| | | | |
|---|---|---|---|
| 5,696,531 A | 12/1997 | Suzuki et al. | 345/132 |
| 5,727,137 A | 3/1998 | LeClair et al. | 375/116 |
| 5,754,192 A | 5/1998 | Sugaya | 346/33 |
| 5,889,927 A | 3/1999 | Suzuki | 395/102 |
| 6,052,203 A * | 4/2000 | Suzuki et al. | 368/1.9 |
| 6,344,870 B1 | 2/2002 | Kerby et al. | 347/253 |
| 6,597,471 B1 * | 7/2003 | Yoshikawa | 358/1.2 |
| 6,621,588 B1 * | 9/2003 | Shimada | 358/1.15 |

FOREIGN PATENT DOCUMENTS

| | | | |
|---|---|---|---|
| EP | 0 348 651 | 1/1990 | |
| EP | 0348662 A2 * | 1/1990 | G06F/15/72 |
| EP | 0 889 437 | 1/1999 | |

OTHER PUBLICATIONS

EP Search Report, dated Dec. 19, 2003, in EP 01307088.
Notice Of Acceptance, dated Oct. 2, 2003, in Australian Ser. No. 767448.

* cited by examiner

*Primary Examiner*—Charles H. Nolan, Jr.
(74) *Attorney, Agent, or Firm*—Fitzpatrick, Cella, Harper & Scinto

(57) ABSTRACT

A method (40) and apparatus (30) is described for performing image rendering of high resolution computer generated images using limited memory and constrained rendering architectures. An image is segmented into a plurality of tiles (110). A graphics renderer (17), which is usually used for rendering low resolution images onto a display device (19), is used to render one tile (110) at a time. The rendered tile images are combined to form a band of the image (101) and the image data of the band (101) is transferred to a printer engine (20) for printing. Each band (101) is rendered and transferred to the printer engine (20) until the whole image is printed.

40 Claims, 3 Drawing Sheets

METHOD AND APPARATUS FOR PRINTING COMPUTER GENERATED IMAGES

TECHNICAL FIELD OF THE INVENTION

The present invention relates generally to printing of computer generated images and, in particular, to utilising regional segmentation and an improved modular extensible electronics based architecture for printing of computer generated images.

BACKGROUND ART

Printing devices are well-known for processing encoded page layout information to form a printed page. The page layout information is first formed into decoded and uncompressed page image data. The page image data is then sent to a raster scanned device, which prints discrete picture elements (pixels) at fixed physical locations on an output medium such as paper. Typically, the pixels have different colours, different intensities and possibly other variable parameters.

In many types of printing devices a high level description of image data to be printed is processed by a raster image processor (RIP) which converts the description into data held in memory for subsequent output to the raster scanned device. The high level description typically takes the form of a page description language (PDL) specification, which is an interchange standard for representing documents electronically within a system and ultimately printing those documents. A PDL file describes, among other things, how images are to be rendered on each page, what font is to be employed and how the pages are to be assembled. In other printer types, the high level description takes the form of bitmap image data which is transcoded into a format suitable for the raster output device for printing. Such printing devices usually containing a command language which enable transfer of said image data.

All the aforementioned printer types use memory for storing intermediate print data and some raster image processor (RIP) to format data into a representation suitable for the print output device.

Those skilled in the art of design of printer devices will appreciate that printing at high resolutions requires the generation of a large amount of raster output data and a correspondingly high amount of computational processing, that being both for rasterisation of a page description and colour conversion of rendered image data for colour output devices.

Game consoles typically comprise components for providing fast rendering of images on a display screen. Such game consoles typically do not have printing capabilities. Prior art game consoles with printing capabilities are only able to print to a resolution up to that of the display screen. Furthermore, a raster image processor in such a game console is not intended to be used for printing, and in particular at resolutions higher than that of the display screen, as the raster image processor is incapable of generating the large amount of raster output data required for such a higher resolution print. This is due to limitations in processing capacity and raster image processor memory in such systems.

SUMMARY OF THE INVENTION

It is an object of the present invention to substantially overcome, or at least ameliorate, one or more disadvantages of existing arrangements.

According to a first aspect of the invention, there is provided a method of rendering an output image on an output device at a first resolution using a rendering device limited to rendering to a second resolution, said second resolution being lower that said first resolution, said method comprising the steps of:

segmenting said output image into a plurality of sub-areas, wherein each sub-area is capable of being rendered by said rendering device at said second resolution;

rendering of each sub-area by said rendering device at a resolution not more than said second resolution;

combining said rendered sub-areas to form a band of said output image; and outputting said band on said output device at said first resolution.

According to a second aspect of the invention, there is provided a method of rendering an output image on a raster scanned device at a first resolution, said method comprising the steps of:

segmenting said output image into a plurality of sub-areas, said sub-areas having a second resolution and said second resolution being lower than said first resolution, wherein longitudinal sub-areas form bands;

sequentially rendering image data for said sub-areas at a second resolution and by a rendering device limited to said second resolution;

upon each of said sub-areas being rendered, transferring said image data to a band buffer;

colour converting said image data to form raster data suitable for said raster scanned device; and upon all sub-areas of a current band being transferred into said band buffer, transferring said raster data of said current band to said raster scanned device.

According to a third aspect of the invention, there is provided an apparatus for rendering an output image on an output device at a first resolution, said apparatus comprising:

a first processor for segmenting said output image into a plurality of sub-areas, each sub-area having a second resolution and said second resolution being lower that said first resolution;

a second processor for rendering each sub-area at said second resolution, said second processor having a resolution limit sufficient for rendering said second resolution, but less than said first resolution,;

means for combining said rendered sub-areas to form a band of said output image; and means for outputting said band on said output device at said first resolution.

According to a fourth aspect of the invention, there is provided an apparatus for rendering an output image on a raster scanned device at a first resolution, said apparatus comprising:

a first processor for segmenting said output image into a plurality of sub-areas, and generating rendering instructions for sub-areas, said sub-areas having a second resolution and said second resolution being lower than said first resolution, wherein longitudinal sub-areas form bands;

a second processor for receiving said rendering instructions from said first processor, and rendering image data for said sub-areas at said second resolution, said second processor having a resolution limit sufficient for rendering said second resolution, but less than said first resolution;

memory means for storing sub-area image data into a band buffer;

colour converting means for colour converting said image data to form raster data suitable for said raster scanned device; and data transfer means for transferring said raster data of a current band to said raster scanned device, upon all sub-areas of said current band being transferred into said band buffer.

BRIEF DESCRIPTION OF THE DRAWINGS

An embodiment of the present invention will now be described with reference to the drawings, in which.

DETAILED DESCRIPTION INCLUDING BEST MODE

Figure 1:
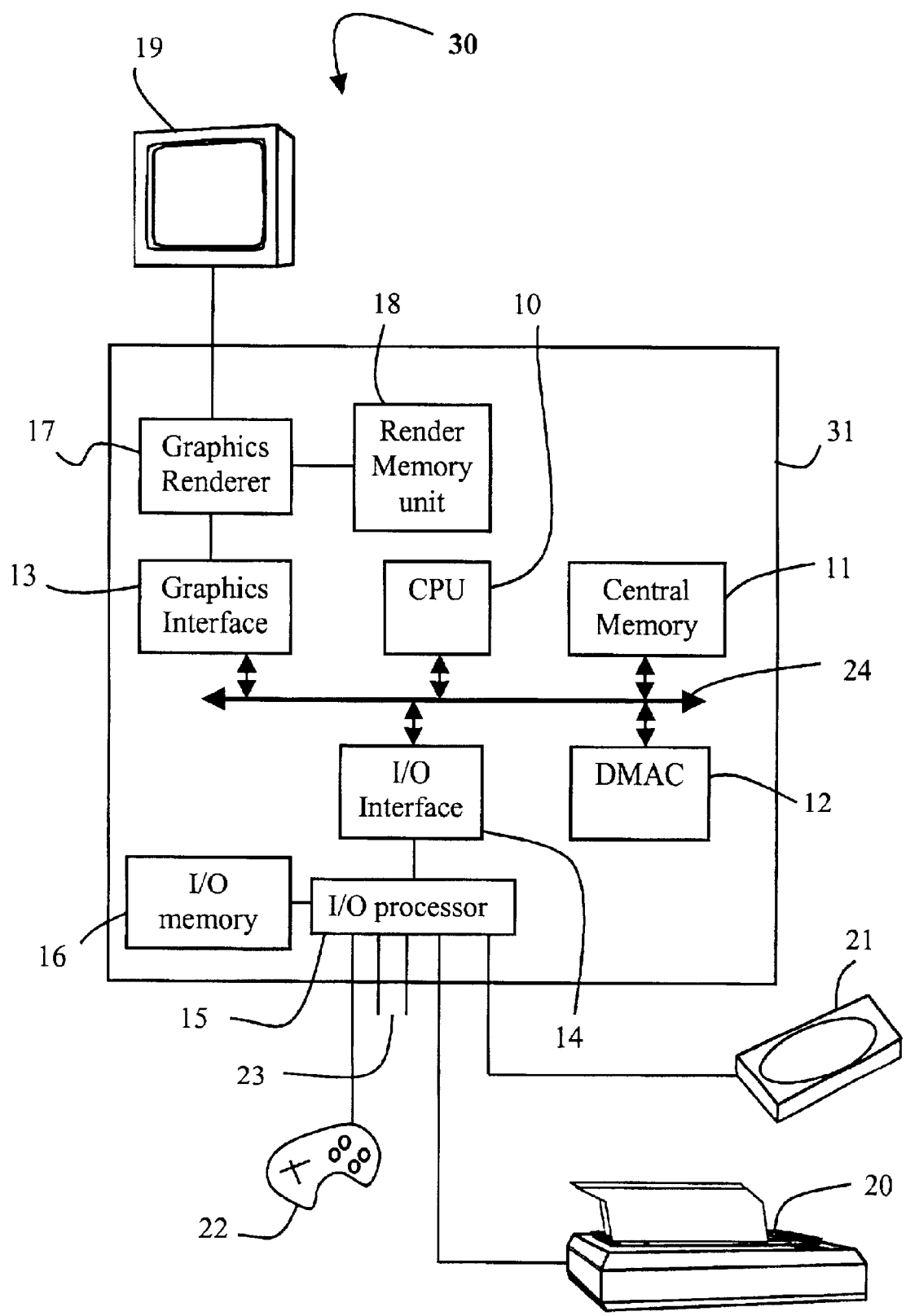
FIG. 1 shows a block diagram of a printing apparatus.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of an apparatus 30 for printing a high-resolution image utilising a limited amount of memory. In the preferred embodiment, the apparatus 30 is a game console. Such a game console was not designed with a capability for printing high resolution outputs. The apparatus 30 comprises a computer module 31, a storage device 21, an input device such as control unit 22, and output devices including a print engine 20 and a display device 19. A user inputs command actions through the control unit 22 and the display device 19 displays command feedback and ancillary information. The print engine 20 may be that in a conventional inkjet printer, facsimile machine, plotter or copier, and prints pixels at fixed physical locations on an output medium such as paper. The higher resolution for printing is determined by the printer driver settings, such as resolution and paper size, of the print engine 20.

The computer module 31 typically includes at least one general purpose central processing unit (CPU) 10, a central memory unit 11, a direct memory access controller (DMAC) 12, a buffered graphics interface (BGIF) 13, and an input/output interface (I/O IF) 14. The components 10 to 14 of the computer module 31, communicate via an interconnected bus 24.

The I/O IF 14 also interfaces with an input/output (I/O) processor 15. The I/O processor 15 controls the operation of the peripheral devices, which includes the print engine 20, the storage device 21, control unit 22 and external peripherals (not illustrated) connected to interface buses 23, according to commands from the CPU 10. The I/O processor 15 also converts data into the appropriate format required by the peripheral devices 20, 21 and 22, and vice versa, and communicates with the CPU 10 and central memory 11 through the I/O IF 14. An I/O memory unit 16 is provided for dedicated use by the I/O processor 15.

The BGIF 13 is connected to a graphics renderer 17 which generates image data for the display device 19. A render memory unit 18 is also provided, connected to the graphics renderer 17 and for dedicated use by the graphics renderer 17. The graphics renderer 17 has limited capacity to process render instructions to form raster output data and the render memory unit 18 has limited capacity to store such raster output data. The capacities of the graphics renderer 17 and render memory unit 18 are sufficient to produce raster output data for the display device 19 and at the resolution required by the display device. Hence, these capacities are insufficient to process and store raster output data for a raster device at a higher resolution than that of the display device 19.

The DMAC 12 is programmed by the CPU 10 to perform direct data transfer to and from the central memory unit 11 and the other memory units, namely the render memory unit 18 and the I/O memory unit 16, without intervention by the CPU 10. The I/O IF 14 manages the transfer of data between the central memory 11 and the I/O memory unit 16.

Typically, an application program is resident on the storage device 21. The application program is read from the storage device 21 and placed in the central memory unit 11, from where it is controlled in its execution by the CPU 10. The application program performs a number of graphics functions, including but not limited to display of three-dimensional models, user interaction with the three-dimensional models, display of images on the display device 19, loading of images from peripherals attached to the I/O processor 15 through the interface buses 23 etc. In the preferred implementation, a three dimensional model is used which is loaded from the storage device 21 and navigated by the user using the control unit 22.

The application program also includes functionality to print an image displayed on the display device 19. The image is displayed on the display device 19 by the graphics renderer 17, and the metrics for the displayed image are determined by the display device 19.

Figure 2:
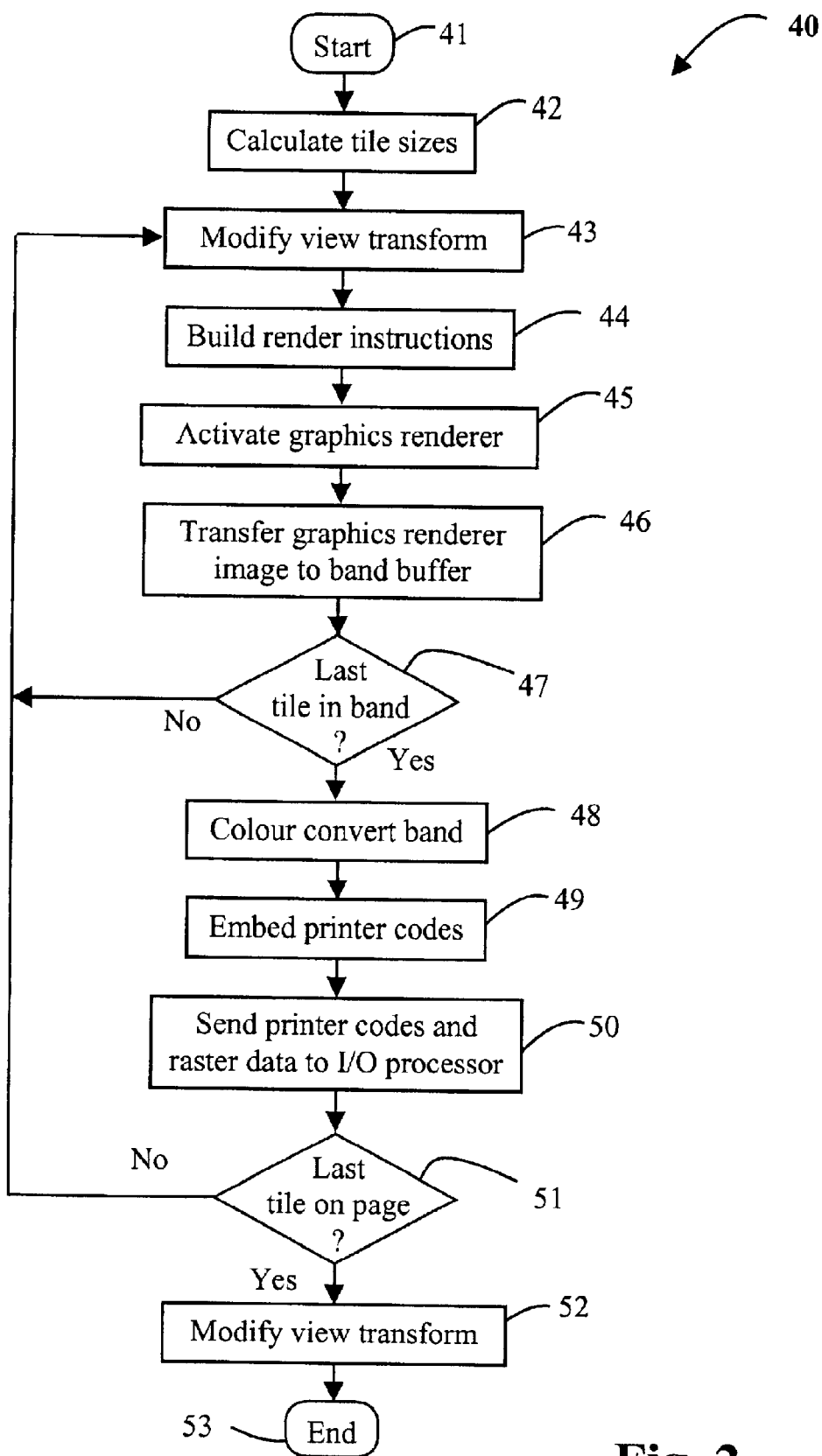
FIG. 2 shows a flow diagram of a method of printing a high resolution output image displayed on the display device.

However, the printing facility is able to print a higher resolution image than the one displayed on the display device 19. FIG. 2 shows a flow diagram of a method 40 of generating a high-resolution output image for printing. The method 40 makes use of the graphics renderer 17 of the apparatus 30, which was never intended to be used for printing. The resolution of the image to be printed is also at a resolution higher than the capacities of the graphics renderer 17 and render memory unit 18. The steps of the method 40 are effected by instructions in the application program that are controlled by the CPU 10.

Figure 3:
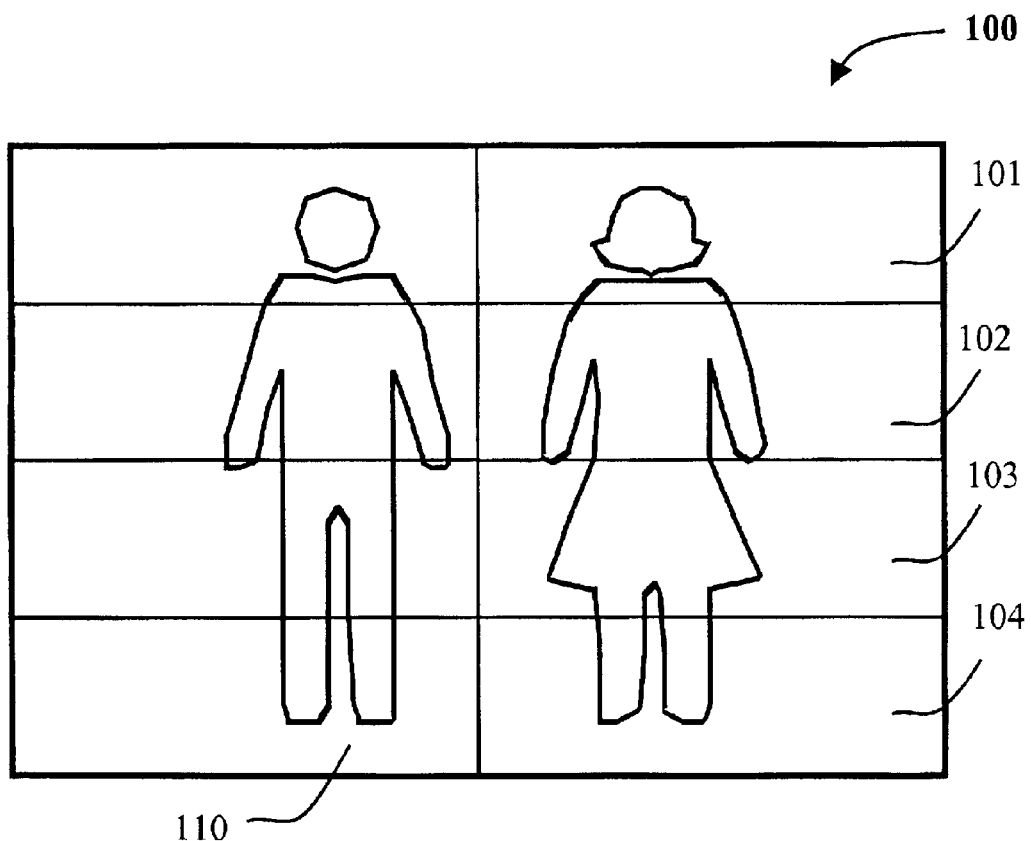
FIG. 3 shows a representation of an output page image broken up into tiles.

Printing is activated in step 41. During printing, the application program suspends controls of the display device 19, and assumes control of the BGIF 13, graphics renderer 17 and render memory unit 18. Referring also to FIG. 3 where a representation of an output page 100 to be printed on the print engine 20 is shown. The method 40 includes the segmentation of the output page image 100 into an integral number of bands 101 to 104. The bands 101 to 104 have a width that is equal to the output page image width and have a height less than the page output image height. The bands 101 to 104 are further subdivided into an integral number of sub-areas or tiles 110, which in height are equal to the band height and have width less than the band width. In step 42 of the method 40, the CPU 10 calculates the dimensions of the tiles 110. This is done by considering the resolution limitations of the graphics renderer 17 and the render memory unit 18. Preferably, the smallest integral number of divisions of the output page 100 is found.

For example, if the graphics renderer 17 has a capacity of rendering a page with dimensions 640 pixels by 448 pixels to a NTSC display, and the higher resolution image for printing is a 600 dpi resolution image, printed to an 8 inch by 6 inch page, hence 4800 pixels by 3600 pixels, then the output page 100 may be divided into an 10 by 10 array of tiles, or 100 tiles. Thus the output page 100 may be divided into tile dimensions of 480 pixels by 360 pixels, with each tile having a resolution within the capacity of the graphics renderer 17 and the render memory unit 18.

Once tile dimensions has been determined, the CPU 10 modifies the graphics view transform matrix in step 43 to render a first tile. In step 44, the CPU 10 constructs render instructions into the central memory unit 11 and suitable for generation of a rendered image according to the new graphics view transform matrix. The graphics renderer 17 is activated by transferring the render instructions in the form of direct memory access (DMA) commands to the graphics renderer 17 in step 45. This causes the graphics renderer 17 to render a raster image of the tile into the render memory unit 18, and consequently also the display device 19.

Next, in step 46, the rendered raster image is transferred from render memory 18 to a band buffer in the central memory unit 11, again through use of the DMAC 12 and BGIF 13 in the form of DMA commands. This completes the rendering of the tile image.

Step 47 determines whether further tiles remain in the current band to be rendered. If step 47 determines that tiles remain, then the method 40 returns to step 43 for rendering the next tile image. If step 47 determines that the all the tile for the current band has been rendered, then the band is marked as complete. Now that the band is completely rendered, it is queued for colour conversion processing in step 48.

Colour conversion is performed in step 48 by the CPU 10 on the completed band in the band buffer in the central memory unit 11. Typically, RGB pixel data suitable for displaying on the display device 19 is converted into CMYK pixel data, which is suitable for the print engine 20. In the preferred implementation, the tile rendering step 45 performed by the graphics renderer is performed concurrently with the band colour converting step 48 performed by the CPU 10.

Printer codes suitable for the printer engine 20 are generated in step 49, which are interleaved with the colour converted raster data of the band and transferred in step 50 to the I/O processor 15, and in particular to the I/O memory unit 16, through another DMA command. The operations within the I/O processor 15 of transferring the printer codes interleaved with raster data from a band to the print engine 20 are described below. Thus, each band is completely rendered before the band is colour converted, printer codes interleaved with the colour converted raster data and then transferred to the I/O processor.

Step 51 determines whether any more bands remain for the output page image 100. If bands remain, then the method 40 returns to step 43 where the first tile of the next band is rendered. Alternatively, if step 51 determines that the last band of the output page image 100 has been sent to the I/O processor 15, then the method continues to step 52 where the view transform is returned to the settings prior to the print operation to again display the full image in an resolution suitable for display device 19. The method 40 ends in step 53 where control of the display device 19 is returned to the graphics functions of the application program.

An application designer typically allocates an amount of memory of the central memory unit 11 for the band buffer. The band buffer memory is typically sufficient to store a whole optimally sized band. However, in a case where the band buffer is insufficient to store a whole optimally sized band, an integral number of scanlines for the band is determined, in step 42, that can be stored in the band buffer. For example, if the higher resolution image for printing is a 600 dpi resolution image with 16 bits per pixel, printed to an 8 inch by 6 inch page, hence 4800 pixels by 3600 pixels, each band will have optimal dimensions 4800 pixels by 360 pixels. A band buffer of at least 3.5 Mbytes is required for such a print. In a case where only 40 Kbytes were allocated for the band buffer, the band buffer is sufficient for holding 2 scanlines of a rendered band. A band with dimensions 4800 pixels by 2 pixels, with 4 colour ink and 8 bits per ink to handle multiple inks or dot sizes, requires 38,400 bytes, which is within the 40 Kbytes limit of the band buffer. Therefore, the band height, and consequently the tile size, is reduced to the determined number of scanlines.

If a graphics renderer 17 with a capacity of rendering 640 pixels by 448 pixels is used for rendering a 600 dpi resolution image on a 8 inch by 5 inch page, hence 4800 pixels by 3000 pixels, then the output page 100 may be divided into an 8 by 300 array of tiles, each tile having dimensions of 600 pixels by 10 pixels. The smaller the height of the tile, in this case 10 pixels, the smaller the amount of memory required to store a band of raster data.

In a case where the band buffer is insufficient to hold one scanline, the band buffer is increased to a size sufficient to hold at least one scanline.

Figure 4:
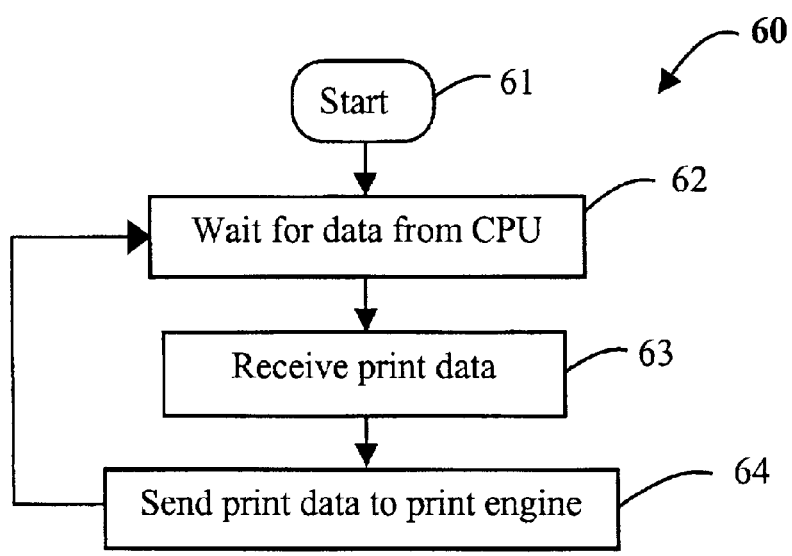
FIG. 4 shows a flow diagram of a method of transferring printer codes interleaved with raster data to a print engine.

FIG. 4 shows a flow diagram of a method 60, performed by the I/O processor 15, of transferring the printer codes interleaved with raster data from the I/O memory unit 16 to the print engine 20. The method 60 operates concurrently with the method 40 performed by the CPU 10 and the graphics renderer 17. The method 60 starts in step 61 where instructions for performing the method 60 are loaded from the storage device 21. In step 62, the I/O processor 15 waits for I/O data, and in particular the printer codes interleaved with raster data, transferred from the CPU 10 to the I/O memory unit 16. Upon receipt of I/O data in step 63, the I/O data is serially transferred to the print engine 20 in step 64. The method returns to step 62 where the I/O processor 15 waits for more I/O data.

In a further implementation, the I/O data is transferred from print engine 20 back to the CPU 10 in error conditions.

In an alternative implementation, the generation of print code data in step 49 is not performed by the CPU in method 40, but rather performed by the I/O processor 15 in method 60. In particular, the generation of print code data is performed after print data in the form of raster data is received in step 63, and sent, interleaved with the raster data to the print engine 20 in step 64.

By generating rendered tiles one at a time, intermediate storage for page-rendering commands are minimised. In particular, by avoiding the need to generate display lists for multiple tiles on a page, memory usage is minimised. This also allows for a simplified graphics renderer to be used, one that does not use a display list architecture. For example, a high level graphics model renderer which renders directly to an output bitmap without the use of an intermediate low level graphics representation may be used to generate each tile in succession, that being achieved by successively modifying the high level graphics view transform to generate the correct high resolution tile for the topologically mapped subarea on the output image as will be appreciated by those skilled in the art of computer graphics.

Another advantage is that a graphics renderer capable of limited output resolution may be employed to generate higher resolution images than the graphics renderer maximum output resolution. Accordingly, generalised rendering processors designed for display purposes other than printing may be employed to render tiles. Furthermore, software implemented raster image processors (RIPs) with limited output resolution capabilities may be employed to generate high-resolution images for printing.

For example, a RIP employing fixed point arithmetic will have limited output resolution ranges. However, through the use of the method 40, a high-resolution output image may be generated.

Yet another advantage is that a computer architecture containing a graphics renderer whose primary usage is other than generation of output image generation for printing may be employed to generate an output image for printing. For example, a general-purpose microprocessor may be coupled with a graphics renderer whose output bitmap is displayed on the display device. Such a graphics renderer may be used to perform render of tiles for generation of a high resolution output image whose resolution dimensions exceed the maximum output resolution capabilities of the rendering processor.

Yet another advantage is that a plurality of processors is employed to minimise output image generation time by partitioning the output image generation into a distinct number of stages which may each be performed by each processor within the confines of distinct memory storage areas so as to permit concurrent operation.

The foregoing describes only some implementations of the present invention, and modifications and/or changes can be made thereto without departing from the scope and spirit of the invention, the implementations being illustrative and not restrictive. For example, one or more of the steps of the preferred methods may be performed in parallel rather than sequentially.

Numerous advantages of the above-described implementations will be appreciated by those skilled in the art.

We claim:

1. A method of rendering an output image on an output device at first pixel dimensions using a rendering device limited to rendering second pixel dimensions, said second pixel dimensions being smaller than said first pixel dimensions, said method comprising the steps of:
   segmenting said output image into a plurality of bands;
   segmenting each band longitudinally into a plurality of sub-areas, each sub-area having pixel dimensions smaller than or equal to said second pixel dimensions;
   rendering each sub-area by said rendering device at pixel dimensions not more than said second pixel dimensions;
   combining said rendered sub-areas to form one or more bands of said output image; and
   outputting said bands on said output device at said first pixel dimensions.

2. A method according to claim 1, wherein said rendering device has a primary function that excludes rendering to said output device.

3. A method according to claim 2, wherein said rendering device's primary function is rendering to a display device.

4. A method according to claim 3, wherein said second pixel dimensions substantially correspond to pixel dimensions of said display device.

5. A method according to claim 1, wherein said rendering step comprises the further steps of:
   modifying a view transform of said output image to correspond with a corresponding sub-area;
   building rendering instructions for said view transform of said output image; and
   converting said rendering instructions to image data.

6. A method according to claim 5 comprising the further step of:
   colour converting said image data to form raster data for outputting on said output device.

7. A method according to claim 6, wherein said output device is a printer and said raster data is interleaved with printer codes before outputting to said output device.

8. A method according to claim 1 comprising an initial step of setting a sub-area height limit, said sub-area height being limited by available storage for storing said band.

9. A method of rendering an output image on a raster scanned device at first pixel dimensions, said method comprising the steps of:
   segmenting said output image into a plurality of bands;
   segmenting said bands longitudinally into a plurality of sub-areas, said sub-areas having second pixel dimensions and said second pixel dimensions being smaller than said first pixel dimensions;
   sequentially rendering image data for said sub-areas at second pixel dimensions and by a rendering device limited to said second pixel dimensions;
   upon each of said sub-areas being rendered, transferring said image data to a band buffer; colour converting said image data to form raster data suitable for said raster scanned device; and
   upon all sub-areas of a current band being transferred into said band buffer, transferring said raster data of said current band to said raster scanned device.

10. A method according to claim 9, wherein said rendering device has a primary function that excludes rendering to said raster scanned device.

11. A method according to claim 10, wherein said rendering device's primary function is rendering to a display device.

12. A method according to claim 9, wherein said rendering step comprises the further steps of:
   modifying a view transform of said output image to correspond with a corresponding sub-area;
   building rendering instructions for said view transform of said image; and
   converting said rendering instructions to image data.

13. A method according to claim 12 comprising the final step of restoring said view transform.

14. A method according to claim 9, wherein said raster data is interleaved with printer codes before transfer to said raster scanned device.

15. A method according to claim 9 comprising an initial step of setting a sub-area height limit, said sub-area height being limited by said band buffer.

16. A method according to claim 9, wherein said raster data is serially transferred to said raster scanned device.

17. A method according to claim 9, wherein said colour converting step is performed concurrently with rendering of a next sub-area.

18. An apparatus for rendering an output image on an output device at first pixel dimensions, said apparatus comprising:
   a first processor for segmenting said output image into a plurality of bands, and segmenting said bands longitudinally into a plurality of sub-areas, each sub-area having second pixel dimensions and said second pixel dimensions being smaller than said first pixel dimensions;

a second processor for rendering each sub-area at said second pixel dimensions, said second processor having a pixel dimension limit sufficient for rendering said second pixel dimensions, but less than said first pixel dimensions;

means for combining said rendered sub-areas to form one or more bands of said output image; and means for outputting said band on said output device at said first pixel dimensions.

19. An apparatus according to claim 18, wherein said second processor has a primary function that excludes rendering for output to said output device.

20. An apparatus as claimed in claim 19, wherein said second processor's primary function is rendering to a display device.

21. An apparatus according to claim 18, wherein said sub-areas have a height limit determined by available storage for storing said band.

22. An apparatus according to claim 18 further comprising a third processor for receiving said band of said output image and controlling the transfer of said band of said output image to said output device.

23. An apparatus according to claim 18 further comprising: colour converting means for colour converting image data to form raster data for outputting on said output device.

24. An apparatus according to claim 23, wherein said output device is a printer, said apparatus further comprising means for interleaving said raster data with printer codes.

25. An apparatus according to claim 18, wherein said second processor renders said image data into a locally addressable rendering memory.

26. An apparatus according to claim 18, wherein said apparatus is a game console.

27. An apparatus for rendering an output image on a raster scanned device at first pixel dimensions, said apparatus comprising:

a first processor for segmenting said output image into a plurality of bands, and segmenting said bands longitudinally into a plurality of sub-areas, and generating rendering instructions for sub-areas, said sub-areas having second pixel dimensions and said second pixel dimensions being smaller than said first pixel dimensions;

a second processor for receiving said rendering instructions from said first processor, and rendering image data for said sub-areas at said second pixel dimensions, said second processor having a resolution limit sufficient for rendering said second pixel dimensions, but less than said first pixel dimensions;

memory means for storing sub-area image data into a band buffer; colour converting means for colour converting said image data to form raster data suitable for said raster scanned device; and data transfer means for transferring said raster data of a current band to said raster scanned device, upon all sub-areas of said current band being transferred into said band buffer.

28. An apparatus as claimed in claim 27, wherein said second processor has a primary function that excludes rendering to said raster scanned device.

29. An apparatus as claimed in claim 28, wherein said second processor's primary function is rendering to a display device.

30. An apparatus according to claim 27, wherein said apparatus is a game console.

31. An apparatus according to claim 27, wherein said second processor renders said image data into a locally addressable rendering memory.

32. An apparatus according to claim 27, wherein said memory means is locally addressable by said first processor.

33. An apparatus according to claim 27 further comprising a third processor for receiving said raster data of said current band and controlling the transfer of said raster data to said raster scanned device.

34. An apparatus according to claim 27 wherein said first processor interleaves printer codes with said raster data, before said data transfer means transfers said interleaved raster data to said raster scanned device.

35. An apparatus according to claim 33 wherein said third processor interleaves printer codes with said raster data.

36. An apparatus according to claim 27 wherein said raster data is serially transferred to said raster scanned device.

37. An apparatus according to claim 27 wherein said colour converting means converts said image data concurrently with said second processor rendering of a next sub-area.

38. An apparatus according to claim 27 wherein said sub-areas have a height limit determined by said memory means.

39. A computer readable medium, having a program recorded thereon, where the program is configured to make a computer execute a procedure to render an output image on an output device at first pixel dimensions using a rendering device limited to rendering to second pixel dimensions, said second pixel dimensions being smaller than said first pixel dimensions, said program comprising:

code for segmenting said output image into a plurality of bands, and segmenting said bands longitudinally into a plurality of sub-areas, each sub-area having pixel dimensions smaller than or equal to said second pixel dimensions;

code for rendering of each sub-area by said rendering device at pixel dimensions not more than said second pixel dimensions;

code for combining said rendered sub-areas to form one or more bands of said output image; and code for outputting said bands on said output device at said first pixel dimensions.

40. A computer readable medium, having a program recorded thereon, where the program is configured to make a computer execute a procedure to render an output image on a raster scanned device at first pixel dimensions, said program comprising:

code for segmenting said output image into a plurality of bands, and segmenting said bands longitudinally into a plurality of sub-areas, said sub-areas having second pixel dimensions and said second pixel dimensions being smaller than said first pixel dimensions;

code for sequentially rendering image data for said sub-areas at second pixel dimensions and by a rendering device limited to said second pixel dimensions;

code for upon each of said sub-areas being rendered, transferring said image data to a band buffer;

code for colour converting said image data to form raster data suitable for said raster scanned device; and upon all sub-areas of a current band being transferred into said band buffer, code for transferring said raster data of said current band to said raster scanned device.

* * * * *

UNITED STATES PATENT AND TRADEMARK OFFICE
CERTIFICATE OF CORRECTION

PATENT NO. : 6,860,203 B2
DATED : March 1, 2005
INVENTOR(S) : Danilo et al.

It is certified that error appears in the above-identified patent and that said Letters Patent is hereby corrected as shown below:

Column 1,
Line 36, "containing" should read -- contain --.

Column 2,
Lines 5 and 41, "that" should read -- than --; and
Line 46, "resolution,;" should read -- resolution; --.

Column 4,
Line 27, "three dimensional" should read -- three-dimensional --.

Column 5,
Line 3, "an" should read -- a --;
Line 27, "determines that the all" should read -- determines that all --; and
Line 59, "an" should read -- a --.

Column 6,
Line 19, "a" should read -- an --.

Column 8,
Line 26, "colour" should read -- ¶ colour --.

Column 9,
Line 49, "colour" should read -- ¶ colour --.

Signed and Sealed this

Fourth Day of October, 2005

JON W. DUDAS
*Director of the United States Patent and Trademark Office*